US007596371B2

(12) United States Patent
Ginzburg et al.

(10) Patent No.: US 7,596,371 B2
(45) Date of Patent: Sep. 29, 2009

(54) DEVICE, SYSTEM, AND METHOD OF SELECTIVELY SCANNING A WIRELESS COMMUNICATION BAND

(75) Inventors: Boris Ginzburg, Haifa (IL); Max Fudim, Kiryat Bialik (IL)

(73) Assignee: Intel Corporation, Santa Clara, CA (US)

(*) Notice: Subject to any disclaimer, the term of this patent is extended or adjusted under 35 U.S.C. 154(b) by 455 days.

(21) Appl. No.: 11/392,826

(22) Filed: Mar. 30, 2006

(65) Prior Publication Data

US 2007/0238426 A1 Oct. 11, 2007

(51) Int. Cl.
*H04W 4/00* (2006.01)
*H04B 1/18* (2006.01)

(52) U.S. Cl. .................... 455/422.1; 455/434; 455/515; 455/161.1

(58) Field of Classification Search ................. 455/434, 455/515–516, 161.1–168.1
See application file for complete search history.

(56) References Cited

U.S. PATENT DOCUMENTS 6,173,181 B1 * 1/2001 Losh .......................... 455/434
7,260,393 B2 * 8/2007 Fnu et al. ................. 455/432.1
7,269,419 B2 * 9/2007 Kim .......................... 455/434
7,366,511 B2 * 4/2008 Jaakkola et al. .......... 455/435.2
2001/0006892 A1 * 7/2001 Barnett et al. ............... 455/434
2006/0094427 A1 * 5/2006 Buckley et al. ............. 455/434
2007/0004405 A1 * 1/2007 Buckley et al. ............. 455/434
2007/0004406 A1 * 1/2007 Jaakkola ..................... 455/434
2008/0081618 A1 * 4/2008 Krantz et al. ............... 455/434

OTHER PUBLICATIONS

IEEE-Std 802.11g-2003 Supplement to 802.11-1999, Wireless LAN MAC and PHY specifications: Further Higher Data Rate Extension in the 2.4 GHz band, Draft 8.2; the 802.11g standard.
IEEE-Std 802.11a-1999, Higher speed Physical Layer (PHY) extension in the 5 GHz band; The 802.11a standard.
IEEE-Std 802.11b-1999 Supplement to 802.11-1999, Wireless LAN MAC and PHY specifications: Higher speed Physical Layer (PHY) extension in 2.4 GHz band; The 802.11b standard.

* cited by examiner

*Primary Examiner*—Simon D Nguyen
(74) *Attorney, Agent, or Firm*—Shiloh & Buchek PLLC

(57) ABSTRACT

Embodiments of the present invention provide a method, apparatus and system of selectively scanning a wireless communication band. In some demonstrative embodiments the method may include, for example, selectively scanning in response to a request to scan a wireless communication band, at least part of the wireless communication band based on a user-customized scanning profile. Other embodiments are described and claimed.

17 Claims, 3 Drawing Sheets

DEVICE, SYSTEM, AND METHOD OF SELECTIVELY SCANNING A WIRELESS COMMUNICATION BAND

BACKGROUND OF THE INVENTION

In the field of wireless communications, a wireless communication system may include, for example, one or more wireless communication stations, and one or more wireless Access Points (APs) able to communicate in accordance with a wireless communication standard or protocol, e.g., the Institute of Electrical and Electronics Engineers (IEEE) 802.11 standard.

The wireless station may perform a scanning operation in which one or more APs may be searched throughout an entire frequency bandwidth utilized by the station. The scanning operation may be performed, e.g., periodically, when the station is associated with an AP, e.g., as part of a roaming procedure; and when the station is not associated with an AP, e.g., in order to establish a wireless connection.

If performed when the station is associated, the scanning operation may interrupt wireless transmissions received and/or transmitted by the station. This may result in reduced quality and/or efficiency of the wireless transmissions. Additionally, the scanning operation may consume a relatively large amount of electrical power, e.g., if performed frequently and/or for long periods of time.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
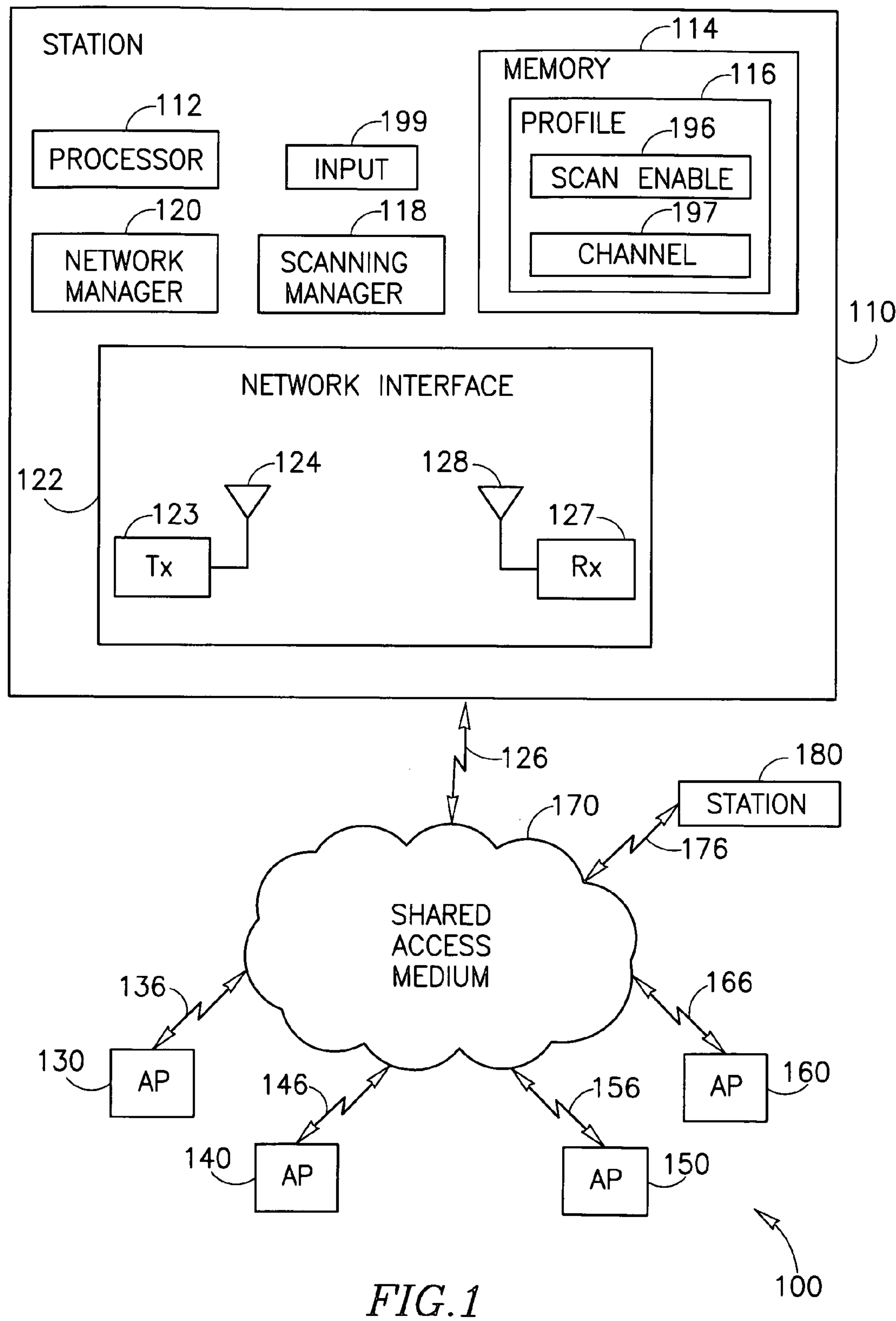
FIG. 1 is a schematic diagram of a wireless communication system in accordance with some demonstrative embodiments of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, parameters, or the like. For example, "a plurality of stations" may include two or more stations.

Some embodiments of the invention may be implemented, for example, using a machine-readable medium or article which may store an instruction or a set of instructions that, if executed by a machine (for example, by a processor and/or by other suitable machines), cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

It should be understood that the present invention may be used in a variety of applications. Although the present invention is not limited in this respect, the circuits and techniques disclosed herein may be used in many apparatuses such as units of a wireless communication system, for example, a Wireless Local Area Network (WLAN) communication system and/or in any other unit and/or device. Units of a WLAN communication system intended to be included within the scope of the present invention include, by way of example only, modems, Mobile Units (MU), Access Points (AP), wireless transmitters/receivers, and the like.

Types of WLAN communication systems intended to be within the scope of the present invention include, although are not limited to, WLAN communication systems as described by "IEEE-Std 802.11, 1999 Edition (ISO/IEC 8802-11: 1999)" standard ("the 802.11 standard"), and more particularly in "IEEE-Std 802.11a-1999, Higher speed Physical Layer (PHY) extension in the 5 GHz band" standard ("the 802.11a standard"), "IEEE-Std 802.11b-1999 Supplement to 802.11-1999, Wireless LAN MAC and PHY specifications: Higher speed Physical Layer (PHY) extension in the 2.4 GHz band" ("the 802.11b standard"), "IEEE-Std 802.11g-2003 Supplement to 802.11-1999, Wireless LAN MAC and PHY specifications: Further Higher Data Rate Extension in the 2.4 GHz band, Draft 8.2" standard ("the 802.11 g standard"), and the like.

Although the scope of the present invention is not limited in this respect, the circuits and techniques disclosed herein may also be used in units of wireless communication systems, digital communication systems, satellite communication systems and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a LAN, wide area network (WAN), or a global communication network, for example, the Internet.

Reference is made to FIG. 1, which schematically illustrates a wireless communication system 100 in accordance with some demonstrative embodiments of the present invention.

System 100 may include, for example, one or more wireless communication stations, e.g., stations 110 and 180, and one or more wireless Access Points (APs), e.g., APs 130, 140, 150, and 160. Components of system 100 may communicate using a shared access medium 170, for example, using wireless communication links 126, 136, 146, 156, and/or 166. System 100 may operate in accordance with any suitable wireless communication standard or protocol, e.g., the 802.11 standard.

According to some demonstrative embodiments of the invention, station 110 may include, for example, a processor 112, a memory 114, and a network interface 122. Station 110 may further include any other suitable hardware components and/or software components.

Processor 112 may include, for example, a Central Processing Unit (CPU), a Digital Signal Processor (DSP), a microprocessor, a controller, a chip, a microchip, an Integrated Circuit (IC), or any other suitable multi-purpose or specific processor or controller.

Memory 114 may include, for example, a Random Access Memory (RAM), a Read Only Memory (ROM), a Dynamic RAM (DRAM), a Synchronous DRAM (SDRAM), a Flash memory, a volatile memory, a non-volatile memory, a cache memory, a buffer, a short term memory unit, a long term memory unit, or other suitable memory units or storage units.

For example, network interface 122 may include a wireless network interface, e.g., a Network Interface Card (NIC), having, for example, a wireless transmitter (Tx) 123 and a wireless receiver (Rx) 127. Transmitter 123 may include, for example, a Radio Frequency (RF) transmitter able to transmit RF signals, e.g., through at least one antenna 124. Receiver 127 may include, for example, a receiver able to receive RF signals, through at least one antenna 128.

In some embodiments, transmitter 123 and receiver 127 may be implemented as a transceiver, a transmitter-receiver, or one or more units able to perform separate or integrated functions of transmitting and/or receiving wireless communication signals, blocks, frames, transmission streams, packets, messages and/or data Antennas 124 and/or 128 may include an internal and/or external RF antenna, for example, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data.

According to some demonstrative embodiments of the invention, one or more stations of system 100, e.g., stations 110 and 180, may perform wireless communications over a predefined wireless communication frequency band, e.g., as defined by the 802.11 standard or any other suitable standard or protocol. One or more APs of system 100, e.g., APs 130, 140, 150, and/or 160, may be adapted to communicate over one or more predefined channels, sub-bands, sections, segments, and/or portions (hereinafter collectively referred to as "channels") of the predefined wireless communication band, e.g., as described below.

Figure 2:
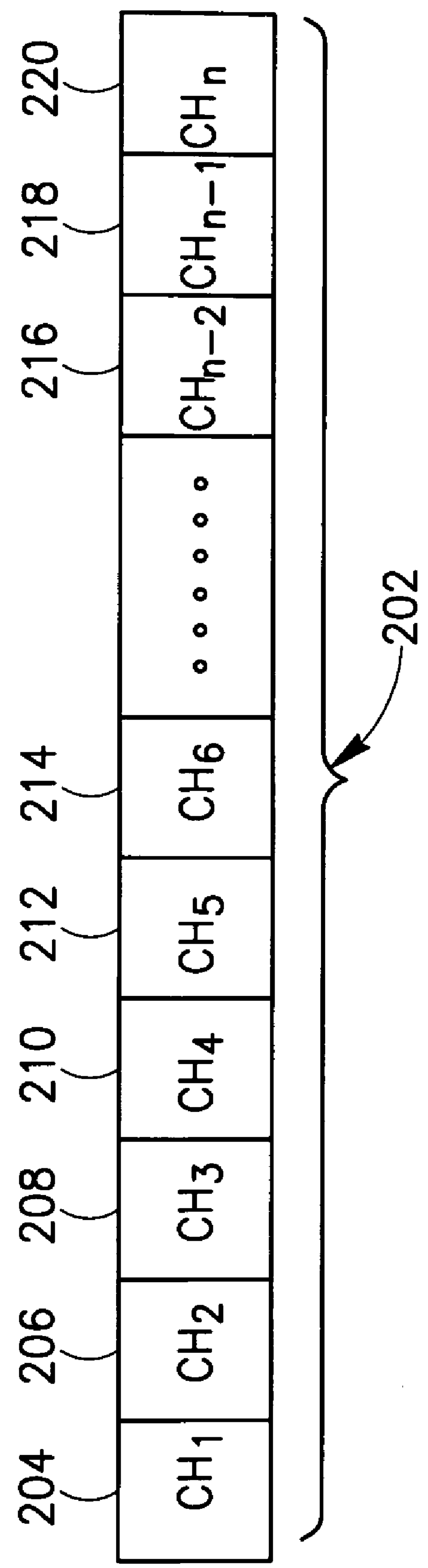
FIG. 2 is a schematic illustration of a wireless communication band including a plurality of channels in accordance with some demonstrative embodiments of the invention.

Reference is also made to FIG. 2, which schematically illustrates a wireless communication frequency band 200 in accordance with some demonstrative embodiments of the invention. Although the invention is not limited in this respect stations 110 and/or 180 may be able to perform wireless communication over frequency band 200. Frequency band 200 may include any suitable frequency band. In one example, band 200 may include frequencies between 2.400 Giga Hertz (GHz) and 2.480 GHz, e.g., as defined by the 802.11b standard. In another example, band 200 may include frequencies between 5.150 GHz and 5.350 GHz, e.g., as defined by the 802.11a standard. Frequency band 200 may include any other suitable frequency range.

According to some demonstrative embodiments of the invention, one or more APs of system 100 may be adapted to communicate over medium 170 using one or more predefined channels of band 200. For example, AP 130 may be adapted to communicate over a channel 204, AP 140 may be adapted to communicate over a channel 210, AP 150 may be adapted to communicate over a channel 218, and/or AP 160 may be adapted to communicate over a channel 206. In other demonstrative embodiments the APs of system may communicate over any other suitable channel partitioning or scheme.

Referring back to FIG. 1, according to some demonstrative embodiments of the invention, station 110 may include, for example, a network manager 120, e.g., a Network Interface Card (NIC) configuration manager, to manage communication over medium 170 in accordance with any suitable network management standard and/or protocol, e.g., the 802.11 standard.

According to some demonstrative embodiments of the invention, station 110 may perform a scanning operation, e.g., as is known in the art. Network manager 120 may generate or initiate, for example, a scan request or command to be performed by station 110 based on any suitable criteria Although the invention is not limited in this respect, the scan request may include, for example, a request to scan the entire communication band, e.g., band 200. For example, network manager 120 may generate the scan request in order to detect an AP of system 100 available for communication. In one exemplary embodiment, network manager 120 may generate the scan request when station 110 is associated with an AP of system 100 ("the associated state"), for example, in order to search for one or more other APs, e.g., as part of a roaming procedure as is known in the art. In another embodiment of the invention, network manager 120 may generate the scan request when station 110 is not associated with an AP over medium 170 ("the non-associated state"), for example, in order to search for an AP available for connection.

According to some demonstrative embodiments of the invention, network manager 120 may generate scan requests, for example, periodically, substantially continuously, and/or in response to a user's instruction. In some embodiments, network manager 120 may generate the scan requests at relatively short time intervals, e.g., approximately every second, and/or at relatively long time intervals, e.g., approximately every 20 or 60 seconds.

According to some demonstrative embodiments of the invention, station 110 may include a scanning manager to selectively scan, e.g., in response to a scan request, at least part of the wireless communication band based on a user-customized scanning profile, e.g., as described in detail below.

According to some demonstrative embodiments of the invention, the user-customized profile may include information defining whether or not a scan should be performed in response to a scan request; and/or a subset of one or more channels to be selectively scanned in response to the scan request. The user-customized profile may be defined, for example, by a user of station 110, based on any suitable criteria, e.g., as described below. Memory 114 may store, for example, at least one user-customized profile 116, which may include an enable-disable indictor 196 to indicate whether or not the scanning operation should be performed, e.g., during the associated state; and/or a channel subset 197 including one or more user-defined channels. User-customized profile 116 may be defined, for example, by the user, e.g., using a user input interface 199. Although the invention is not limited in this respect, input interface 199 may be implemented, for example, by network manager 120. For example, network manager 120 may enable the user to define profile 116, e.g., as part of a definition, setup and/or configuration of a wireless network connection.

According to some demonstrative embodiments of the inventions memory 114 may store a plurality of user-customized profiles 116, which may relate to a plurality of scanning schemes, which may be defined by the user. The scanning schemes may include different settings relating to whether or not scanning is to be performed, and/or the channel subset to be selectively scanned in response to the scan request. Network manager 120 may enable the user to select, for example, one of the user profiles 116 to be implemented, e.g., by scanning manager 118, to selectively scan the communication band. The user may define and/or select the profile to be used for a network connection based, for example, on a layout, e.g., a geographical layout, of station 110 relative to one or more APs of system 100, e.g., as described below.

According to some demonstrative embodiments of the invention, in a first layout of system 100, station 110 may be able to communicate with a single AP. For example, the layout may include an area, e.g., an office, or a residence which may include a single predefined AP, e.g., AP 130, able to communicate with station 110 over medium 170. In a second layout of system 100, station 110 may be able to communicate with two or more predefined APs over medium 170. For example, the second layout may include an area, e.g., an airport, an office, a residence, a shopping center, or the like, which may include a predefined number of two or more APs, e.g., AP 140, 150 and 160. It will be appreciated by those of ordinary skill in the art that system 100 may include any alternative and/or additional suitable layouts.

According to some demonstrative embodiments of the invention, profiles 116 may include, for example, one or more user-customized profiles. A first profile of profiles 116 may include, for example, information 196 indicating that scanning should not be performed in response to a scan request, e.g., received at the associated state. A second profile of profiles 116 may include, for example, information 196 indicating that scanning is to be performed in response to a scan request, e.g., received at the associated state; and/or channel subset 197 may indicate channels 206, 210, and 218 are to be scanned in response to the request, e.g., if it is required to attempt to connect to one of APs 160, 140, and 150, respectively. A third profile of profiles 116 may include, for example, information 196 indicating that scanning should be performed in response to a scan request, e.g., received at the associated state; and/or channel subset 197 may indicate channels 206 and 210 are to be scanned in response to the request, e.g., if it is required to attempt to connect only to one of APs 160 and 140, respectively. Profiles 116 may include any other suitable additional or alternative profiles.

In one example, it may be desired not to perform a scanning operation, e.g., at the associated state. It may be desired not to perform the scanning operation, for example, in the first layout of system 100, since it may be assumed, for example, that there may be no other AP available for connection except for the AP already associated with station 110. Additionally or alternatively, it may be desired not to perform the scanning operation, e.g., at the associated state, in the second layout of system 100, in order to avoid disrupting a wireless communication at the associated state, for example, if the wireless communication includes a communication sensitive to delays, e.g., a voice communication or a High Definition Television (HDTV) communication. Accordingly, the user of station 110 may select the first user-customized profile, e.g., using network manager 120.

In another example, it may be desired to perform scanning of one or more of the channels implemented by two or more predefined APs; e.g., in the second layout of system 100. Accordingly, the user of station 110 may select, for example, the second or the third user-customized profiles, e.g., to enable scanning channels 206, 210, and 218, if it is required to attempt to connect to one of APs 160, 140, and 150; or to enable scanning channels 206 and 210, if it is required to attempt to connect only to one of APs 160 and 140.

According to some demonstrative embodiments of the invention, network manager 120 and/or scanning manager 118 may be implemented, for example, as hardware components, as software components, as combined hardware/software components, as part of processor 112, as part of network interface 122, as a unit or sub-unit of station 110, as part of a MAC module or MAC layer or MAC component of station 110, as a communication driver, as a dedicated controller, as an Integrated Circuit (IC), or the like. In some embodiments, network manager 120 and/or scanning manager 118 may be operatively associated with, or may communicate with, one or more components of station 110, for example, processor 112, network interface 122, a MAC module, a MAC component, a MAC layer, other (e.g., upper) layers of station 110, layers or components or controllers of station 110 which may control or perform downlink and/or uplink communication, or the like.

Figure 3:
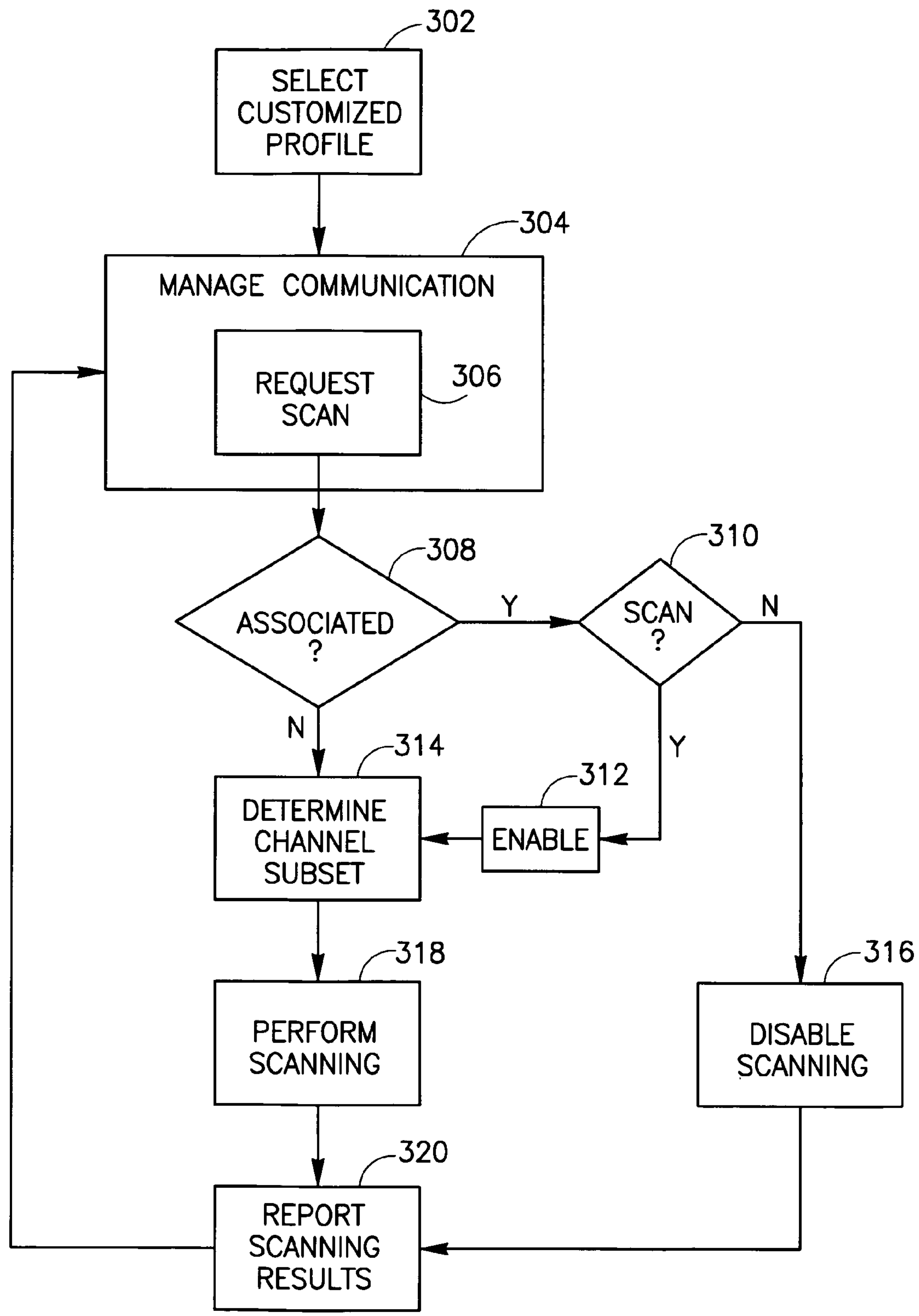
FIG. 3 is a schematic flow-chart illustration of a method of selectively scanning a wireless communication band in accordance with some demonstrative embodiments of the invention.

Reference is now made to FIG. 3, which schematically illustrates a method of selectively scanning a wireless communication band in accordance with some demonstrative embodiments of the invention. Although the invention is not limited in this respect, operations of the method of FIG. 3 may be implemented, for example, by system 100 (FIG. 1), by station 110 (FIG. 1), by scanning manager 118 (FIG. 1), by network manager 125 (FIG. 1), and/or by other suitable stations, and/or systems.

As indicated at block 302, the method may include, for example, selecting a user-customized profile. For example, network manager 120 (FIG. 1) may generate one or more profiles 116 (FIG. 1), e.g., based on one or more definitions, attributes and/or parameters provided by the user of station 110 (FIG. 110) via interface 199 (FIG. 1). Network manager 120 (FIG. 1) may select a customized user-profile based on a selection made by the user of station 110 (FIG. 1), e.g., if profiles 116 (FIG. 1) include a plurality of profiles.

As indicated at block 304, the method may also include, for example, managing a wireless communication. For example, network manager 120 may manage the wireless communication of station 110 (FIG. 1), e.g., based on the 802.11 standard. Managing the wireless communication may include, for example, generating a scan request, e.g., as indicated at block 306. For example, network manager 120 (FIG. 1) may generate the scan request, e.g., as described above.

As indicated at block 308, the method may also include determining whether the scanning is to be performed during at associated state or at the non-associated state. For example, scanning manager 118 (FIG. 1) may use any suitable algorithm and/or method, e.g., as are known in the art, to determine whether station 110 (FIG. 1) is at the associated state, e.g., upon receiving the scan request.

As indicated at block 310, the method may include determining whether scanning is to be enabled, for example, based on the selected scanning profile, e.g., if it is determined that the scanning is to be performed at the associated state. For example, scanning manager 116 (FIG. 1) may determine whether scanning is to be enabled or disabled based on information 196 (FIG. 1) of the selected profile.

As indicated at block 312, the method may include enabling the scanning operation, e.g., if the selected scanning profile enables scanning at the associated state. As indicated at block 316, the method may include disabling the scanning operation, e.g., if the selected scanning profile indicates the scanning operation is to be disabled at the associated state. These operations may be performed, for example, by scanning manager 118 (FIG. 1).

As indicated at block 314, the method may include, for example, determining a channel subset to be scanned, e.g., based on the selected scanning profile. For example, scanning manager 116 (FIG. 1) determine the channel subset based on channel subset 197 (FIG. 1) of the selected profile.

As indicated at block 318 the method may include, for example, performing the scanning operation over the channel subset. This may be performed, for example, by scanning manager 118 (FIG. 1), and/or network interface 122 (FIG. 1).

As indicated at block 318 the method may include, for example, reporting results of the scanning operation. For example, scanning manager 118 (FIG. 1), and/or network interface 122 (FIG. 1), may report the results of the scanning operation to network manager 120 (FIG. 1). For example, it may be reported that no APs have been found, e.g., if the scanning operation has been disabled, and/or if no AP was detected during the search of the channel subset.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method comprising:

storing by wireless communication station a plurality of user-defined scanning profiles, wherein each scanning profile includes a user-defined channel subset defining one or more user-defined wireless communication channel of a wireless communication band, and a user-defined scan-enable indicator indicating whether or not scanning is to be performed during an associated state, in which the station is associated with an access point;

selecting a scanning profile of the plurality of scanning profiles;

receiving a request to scan the wireless communication band during the associated state; and if the indicator of the selected scanning profile indicates that scanning is to be performed during the associated state, performing a scanning operation by selectively scanning the user-customized channel subset of the selected user-customized scanning profile.

2. The method of claim 1, wherein selecting the scanning profile includes selecting the scanning profile based on a selection by a user of the station.

3. The method of claim 1 comprising disabling the scanning operation during the associated state, if the indicator of the selected scanning profile indicates that scanning is not to be performed during the associated state.

4. The method of claim 1, wherein the plurality of user-defined scanning profiles includes a plurality of profiles relating to a plurality of different system layouts.

5. The method of claim 1, wherein for at least one of the plurality of user-defined scanning profiles, the user-defined channel subset defines a single communication channel and the indicator indicates that scanning is not to be performed during the associated state, and wherein for at least another one of the plurality of user-defined scanning profiles, the user-defined channel subset defines two or more communication channels and the indicator indicates that scanning is to be performed during the associated state.

6. The method of claim 1 comprising interfacing with a user of the station to receive user information defining a profile of the plurality of profiles, wherein the user information defines the channel subset to be assigned to the scanning profile being defined, and wherein the user information defines the scan-enable indicator to be assigned to the scanning profile being defined; and generating the defined scanning profile according to the user information.

7. The method of claim 1 comprising receiving a request to scan the wireless communication band during an un-associated state, and selectively scanning the user-customized channel subset of the selected user-customized scanning profile.

8. An apparatus comprising:

a memory to store a plurality of user-defined scanning profiles, wherein each scanning profile includes a user-defined channel subset defining one or more user-defined wireless communication channels of a wireless communication band, and a user-defined scan-enable indicator indicating whether or not scanning is to be performed during an associated state, in which the apparatus is associated with an access point;

a network manager to select a scanning profile of the plurality of scanning profiles; and a scanning manager to receive from the network manager a request to scan the wireless communication band during the associated state; and, if the indicator indicates that scanning is to be performed during the associated state, to perform a scanning operation by selectively scanning the user-customized channel subset of the selected user-customized scanning profile.

9. The apparatus of claim 8, wherein said scanning manager is able to select the scanning profile based on a selection by a user of the station.

10. The apparatus of claim 8, wherein said scanning manager is able to disable the scanning operation during the associated state, if the indicator of the selected scanning profile indicates that scanning is not to be performed during the associated state.

11. The apparatus of claim 8, wherein the plurality of user-defined scanning profiles include a plurality of profiles relating to a plurality of different system layouts.

12. The apparatus of claim 8, wherein for at least one of the plurality of user-defined scanning profiles, the user-defined channel subset defines a single communication channel and the indicator indicates that scanning is not to be performed during the associated state, and wherein for at least another one of the plurality of user-defined scanning profiles, the user-defined channel subset defines two or more communication channels and the indicator indicates that scanning is to be performed during the associated state.

13. The apparatus of claim 8, including an interface to interface with a user to receive user information defining a profile of the plurality of profiles, wherein the user information defines the channel subset to be assigned to the scanning profile being defined, and wherein the user information defines the scan-enable indicator to be assigned to the scanning profile being defined, wherein the network manager is to generate the defined scanning profile according to the user information.

14. The apparatus of claim 8, wherein said scanning manager is able to receive from the network manager a request to scan the wireless communication band during an un-associated state and, and to selectively scan the user-customized channel subset of the selected user-customized scanning profile.

15. A wireless communication system comprising:

a wireless station including:

at least one omni-directional antenna to receive one or more signals over a wireless communication band;

a memory to store a plurality of user-defined scanning profiles, wherein each scanning profile includes a user-defined channel subset defining one or more user-defined wireless communication channels of the wireless communication band, and a user-defined scan-enable indicator indicating whether or not scanning is to be performed during an associated state, in which the station is associated with an access point;

a network manager to select a scanning profile of the plurality of scanning profiles; and a scanning manager to receive from the network manager a request to scan the wireless communication band during the associated state; and, if the indicator indicates that scanning is to be performed during the associated state, to perform a scanning operation by selectively scanning the user-customized channel subset of the selected user-customized scanning profile.

16. The system of claim 15, wherein said scanning manager is able to select the scanning profile based on a selection by a user of the station.

17. The system of claim 15, wherein the station includes an interface to interface with a user to receive user information defining a profile of the plurality of profiles, wherein the user information defines the channel subset to be assigned to the scanning profile being defined, and wherein the user information defines the scan-enable indicator to be assigned to the scanning profile being defined, and wherein the network manager is to generate the defined scanning profile according to the user information.

* * * * *

UNITED STATES PATENT AND TRADEMARK OFFICE

CERTIFICATE OF CORRECTION

PATENT NO. : 7,596,371 B2
APPLICATION NO. : 11/392826
DATED : September 29, 2009
INVENTOR(S) : Boris Ginzburg et al.

It is certified that error appears in the above-identified patent and that said Letters Patent is hereby corrected as shown below:

In column 8, line 12, in Claim 1, after "by" insert -- a --.

In column 8, line(s) 15–16, in Claim 1, delete "channel" and insert -- channels --, therefor.

In column 9, line 34, in Claim 13, delete "claim 8," and insert -- claim 8 --, therefor.

Signed and Sealed this

Twenty-sixth Day of January, 2010

David J. Kappos

*Director of the United States Patent and Trademark Office*

UNITED STATES PATENT AND TRADEMARK OFFICE

CERTIFICATE OF CORRECTION

PATENT NO. : 7,596,371 B2
APPLICATION NO. : 11/392826
DATED : September 29, 2009
INVENTOR(S) : Ginzburg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 503 days.

Signed and Sealed this

Twenty-eighth Day of September, 2010

David J. Kappos

*Director of the United States Patent and Trademark Office*